(12) United States Patent
Shiozawa

(10) Patent No.: US 11,720,624 B2
(45) Date of Patent: Aug. 8, 2023

(54) STORAGE DEVICE, ELECTRONIC SYSTEM INCLUDING STORAGE DEVICE, AND CONTROL PROGRAM FOR STORAGE DEVICE

(71) Applicant: KIOXIA CORPORATION, Tokyo (JP)

(72) Inventor: Tatsuo Shiozawa, Setagaya Tokyo (JP)

(73) Assignee: Kioxia Corporation, Tokyo (JP)

( * ) Notice: Subject to any disclaimer, the term of this patent is extended or adjusted under 35 U.S.C. 154(b) by 984 days.

(21) Appl. No.: 16/111,866

(22) Filed: Aug. 24, 2018

(65) Prior Publication Data

US 2019/0294704 A1    Sep. 26, 2019

(30) Foreign Application Priority Data

Mar. 20, 2018    (JP) .................... 2018-053268

(51) Int. Cl.
*H04L 29/08*    (2006.01)
*G06F 3/06*    (2006.01)
(Continued)

(52) U.S. Cl.
CPC ............ *G06F 16/58* (2019.01); *G06F 3/0601* (2013.01); *G06F 3/0605* (2013.01);
(Continued)

(58) Field of Classification Search
CPC .... G06F 3/0622; G06F 3/0637; G06F 3/0601; G06F 3/0679; G06F 3/0605;
(Continued)

(56) References Cited

U.S. PATENT DOCUMENTS 8,864,019 B2    10/2014  Hashimoto
2006/0026211 A1*  2/2006  Potteiger ................. G06F 3/061
(Continued)

FOREIGN PATENT DOCUMENTS

JP    2008172407 A    7/2008
JP    2017135517 A    8/2017

OTHER PUBLICATIONS

Luigi Bruno et al. "The FAT File System" Article originally published Jan. 13, 2012, last revised Jul. 11, 2013 (7 pages + cover) https://social.technet.microsoft.com/wiki/contents/articles/6771.the-fat-file-system.aspx (Year: 2013).*

*Primary Examiner* — Joseph P Hirl
*Assistant Examiner* — Thomas A Gyorfi
(74) *Attorney, Agent, or Firm* — Kim & Stewart LLP

(57) ABSTRACT

In one embodiment, a storage device that is installable in an electronic apparatus includes a first communication interface for connecting the electronic apparatus to the storage device, a nonvolatile memory for storing data and data management table storing a data size and address information for the data stored in the nonvolatile memory, and a processor configured to change at least one piece of data stored in the nonvolatile memory without changing file management information stored in the data management table. The processor is configured to change the stored data without receiving an instruction to do so from the electronic apparatus through the first interface.

19 Claims, 7 Drawing Sheets

(51) Int. Cl.
  *G06F 16/58* (2019.01)
  *G06F 16/38* (2019.01)
  *H04W 12/047* (2021.01)
  *G06F 12/02* (2006.01)
  *H04W 12/77* (2021.01)

(52) U.S. Cl.
  CPC .......... *G06F 3/0622* (2013.01); *G06F 3/0637* (2013.01); *G06F 3/0679* (2013.01); *G06F 12/0246* (2013.01); *G06F 16/381* (2019.01); *H04W 12/047* (2021.01); *H04W 12/77* (2021.01)

(58) Field of Classification Search
  CPC .. G06F 3/0632; G06F 12/0246; G06F 16/381; G06F 16/58; H04L 67/1095; H04L 67/2852; H04W 12/047; H04W 12/77
  See application file for complete search history.

(56) References Cited

U.S. PATENT DOCUMENTS

| | | | |
|---|---|---|---|
| 2013/0161383 A1* | 6/2013 | Hashimoto | H04N 1/00167 235/375 |
| 2015/0245281 A1* | 8/2015 | Beguin | H04W 12/50 370/255 |
| 2017/0215070 A1* | 7/2017 | Sakai | H04W 12/08 |

\* cited by examiner

STORAGE DEVICE, ELECTRONIC SYSTEM INCLUDING STORAGE DEVICE, AND CONTROL PROGRAM FOR STORAGE DEVICE

CROSS-REFERENCE TO RELATED APPLICATIONS

This application is based upon and claims the benefit of priority from Japanese Patent Application No. 2018-053268, filed Mar. 20, 2018, the entire contents of which are incorporated herein by reference.

FIELD

Embodiments described herein relate generally to a storage device, electronic systems including a storage device, information processing systems, and control programs for storage devices.

BACKGROUND

Storage devices that can be installed in an electronic apparatus are widely used. An electronic apparatus in which a storage device is installed may write data to the storage device or may read data from the storage device. As an example of the storage device, there is a memory card which can be directly accessed by a wireless communication function. Thus, in addition to data access via a directly connected electronic apparatus, the memory card may also transmit and receive data by wireless communication to another device without such data passing through the electronic apparatus, and may store received data as a file in the memory card and transmit requested data that has been previously stored in the memory card.

DETAILED DESCRIPTION

Figure 1:
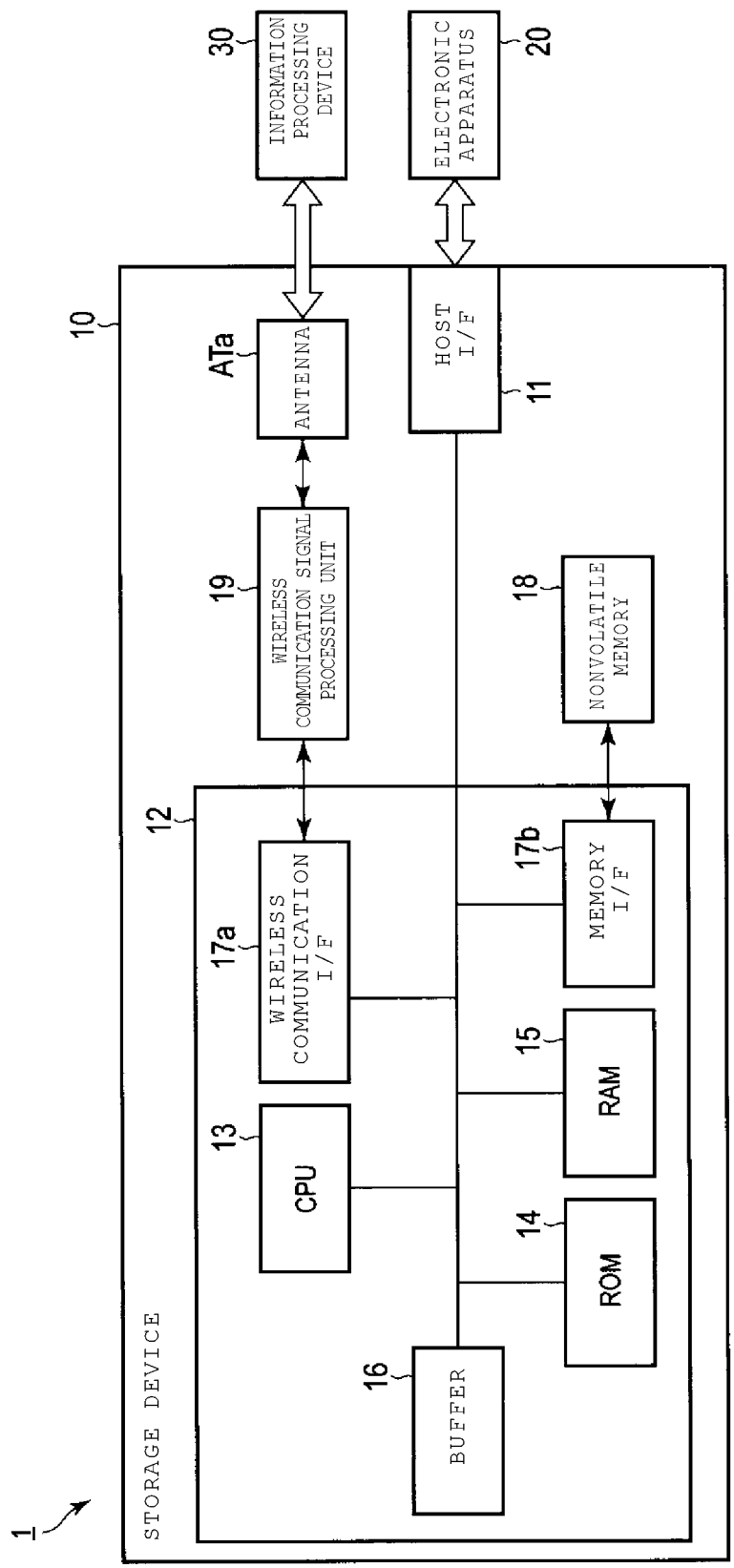
FIG. 1 is a block diagram illustrating an example of a configuration of a storage device including a wireless communication function and an information processing system including the storage device according to a first embodiment.

According to one embodiment, a storage device that is installable in an electronic apparatus comprises: a first communication interface for connecting the electronic apparatus to the storage device; a nonvolatile memory for storing data and data management table storing a data size and address information for data stored in the nonvolatile memory; and a processor configured to change at least one piece of data stored in the nonvolatile memory without changing file management information stored in the data management table for the at least one piece of data. The processor is configured to change the at least one piece of stored data without receiving an instruction from the electronic apparatus through the first interface.

The present disclosure describes in one example embodiment a storage device that operates as an access point for wireless communication and provides an identification ID and a password for access via wireless communication, and an electronic system including the storage device in conjunction with an electronic apparatus to which the storage device is physically connected, and a control program for controlling functions and operations of the storage device.

A storage device according to a present embodiment may be installed within an electronic apparatus or otherwise connected thereto. The storage device includes a first interface that handles an interfacing process between the electronic apparatus and the storage device, a nonvolatile memory that stores a data and file management information storing a data size of each of at least the plurality of pieces of data, and a processor that updates first data stored in the nonvolatile memory without changing first file management information corresponding to the first data, without depending on an instruction from the electronic apparatus through the first interface.

In recent years, wireless communication has become possible between various kinds of electronic apparatuses (in particular, portable digital apparatuses). Examples of the various kinds of electronic apparatuses being enabled for wireless communication include portable information terminals such as a Personal Computer (PC), a laptop, a Personal Digital Assistant (PDA), a mobile phone, a portable audio player, a digital camera, or the like.

When wireless communication is possible, user convenience can be improved since a connection by a cable is not necessary. As a wireless Local Area Network (LAN) systems have become more widespread, even portable storage devices (for example, an SD card) that may be installed in an electronic apparatus, have introduced wireless communication capabilities.

For such portable storage devices to be able to communicate over wireless LAN, it is generally necessary to set an identification ID and a password for identifying the wireless LAN system. However, usually, these portable storage devices do not have their own user-accessible interface systems such as for text input. Therefore, it may be necessary for a user to set the identification ID and the password using a dedicated tool after installing the storage device in an electronic apparatus, and this may be inconvenient for a user.

However, in an embodiment of the present disclosure, a storage device automatically generates the identification ID and the password necessary for wireless communication. The storage device, for example, generates a two-dimensional code incorporating the generated identification ID and password, and stores the two-dimensional code as an image file in a memory inside the storage device. The electronic apparatus in which the storage device is installed may then display the image file. An information processing device to be connected by wireless communication may simply acquire the identification ID and the password by reading the two-dimensional code displayed as an image on the electronic apparatus.

Hereinafter, example embodiments will be described with reference to the drawings. In the following description, substantially the same functions and elements are denoted by the same reference numerals, and description will be given as necessary.

In the present disclosure, the term "ID" indicates identification information. In addition, the "identification ID" for the wireless communication is identification information for identifying an access point for wireless communication. More specifically, for example, the identification ID is a Service Set Identifier (SSID) or the like indicating identification information of a wireless LAN.

In the present disclosure, a "two-dimensional code" is a code structure providing encoded information along a horizontal direction and a vertical direction. For example, the two-dimensional code is QR code® or the like.

In the present disclosure, it is assumed that the term "access" includes at least one of writing or reading data to and from the storage device.

In the present disclosure, "turning on a flag" means writing and/or rewriting a stored flag value to a state (for example, "1") indicating that the flag is valid (logic value=true), and "turning off a flag" means writing and/or rewriting a stored flag value to a state (for example, "0") indicating that the flag is invalid (logic value=false).

FIG. 1 is a block diagram illustrating an example of a storage device 10 having a wireless communication function and an information processing system 1 including the storage device 10 according to a present embodiment.

For example, the information processing system 1 includes the storage device 10, an electronic apparatus 20 into which storage device 10 can be installed (physically connected), and an information processing device 30 capable of wirelessly communicating with the storage device 10 (directly rather than only via electronic apparatus 20).

When the storage device 10 is connected to the electronic apparatus 20 through a host interface (I/F) 11, the storage device 10 operates by receiving a power source supply from the electronic apparatus 20, and performs processing according to access from the electronic apparatus 20.

The storage device 10 includes a controller 12. For example, the controller 12 includes a Central Processing Unit (CPU) 13, a Read Only Memory (ROM) 14, a Random Access Memory (RAM) 15, a buffer 16, a wireless communication interface (I/F) 17a, a memory interface (I/F) 17b, and the like. The CPU 13, the ROM 14, the RAM 15, the buffer 16, the wireless communication interface 17a, the memory interface 17b, and the like are connected with each other by a bus. In addition, for example, the controller 12 may be divided into a plurality of sub-system controllers such as a memory controller including the memory interface 17b, and a wireless controller including the wireless communication interface 17a.

The host interface 11 performs an interface process between the storage device 10 and the electronic apparatus 20. The controller 12 and the host interface 11 are connected by the bus. The host interface 11 may be provided in the controller 12.

The CPU 13 is a processor that controls the operations of the storage device 10. For example, the CPU 13 may be configured and/or controlled by a control program or the like stored in the ROM 14. The control program may be loaded on the RAM 15 to execute a predetermined process.

For example, the CPU 13 receives various commands such as a write command, a read command, and an erase command, and an instruction from the electronic apparatus 20 through the host interface 11. The CPU 13 accesses particular areas of a nonvolatile memory 18 based on the command. In addition, the CPU 13 controls a data transmission through the buffer 16 based on a command.

The ROM 14 stores firmware such as the control program used by the CPU 13.

The RAM 15 is used as a work area of the CPU 13, and stores the control program and various pieces of data necessary for executing the control program. For example, the RAM 15 may be used as a cache memory that temporarily stores data. The RAM 15 can be a volatile memory such as a Static Random Access Memory (SRAM), or a Dynamic Random Access Memory (DRAM).

The buffer 16 stores a fixed amount of data (for example, one page) when writing data received from the electronic apparatus 20 or otherwise to the nonvolatile memory 18. In addition, the buffer 16 temporarily stores data when transmitting data read from the nonvolatile memory 18 to the electronic apparatus 20 or otherwise.

A wireless communication signal processing unit 19 is connected to the wireless communication interface 17a. An antenna ATa for transmitting and receiving a high frequency signal is connected to the wireless communication signal processing unit 19. The wireless communication signal processing unit 19 controls the wireless communication function by the wireless LAN such as according to Wi-Fi protocol or the like.

The wireless communication interface 17a interfaces between the controller 12 and the wireless communication signal processing unit 19. More specifically, the wireless communication interface 17a receives a command, an address, data, information, an instruction, a signal, or the like from information processing device 30 through the antenna ATa and the wireless communication signal processing unit 19.

The wireless communication signal processing unit 19 performs signal processing for the wireless communication process. Here, the wireless communication signal processing unit 19 is controlled by the wireless communication interface 17a.

The wireless communication interface 17a outputs data to the wireless communication signal processing unit 19, based on the received command. The data processed by the wireless communication signal processing unit 19 is transmitted to the information processing device 30 through the antenna ATa. In addition, the wireless communication interface 17a reads data from the nonvolatile memory 18 through the memory interface 17b based on the received command, address, and the like, and outputs the data to the wireless communication signal processing unit 19. In addition, the wireless communication interface 17a stores the data in the nonvolatile memory 18 through the memory interface 17b based on the received command, address, data, and the like.

The nonvolatile memory 18 is connected to the memory interface 17b. The memory interface 17b performs an interface process between the controller 12 and the nonvolatile memory 18. More specifically, for example, the memory interface 17b writes data to the nonvolatile memory 18 or reads data from the nonvolatile memory 18 based on commands received from the electronic apparatus 20 through the host interface 11.

For example, the nonvolatile memory 18 maybe a NAND type flash memory. However, the nonvolatile memory 18 may also be another type of nonvolatile memory such as a NOR type flash memory, a magneto resistive Random Access Memory (MRAM: magneto resistive memory), a phase change Random Access Memory (PCRAM: phase change memory), a resistive change random Access Memory (ReRAM: resistance change type memory), or a ferroelectric Random Access Memory (FeRAM). For example, the nonvolatile memory 18 may be a nonvolatile semiconductor memory, a magnetic-type memory, or the like. The nonvolatile memory 18 may have a three-dimensional, stacked structure. In addition, the ROM 14 can be the same type of the memory as the nonvolatile memory 18 as described above or may be a different type.

In the present embodiment, the CPU 13 generates the identification ID and the password necessary for the wireless communication interface 17a to operate as a wireless access point, and writes the identification ID and the password in the RAM 15. In addition, the CPU 13 generates the image for incorporating the two-dimensional code including the identification ID and the password, and writes the image in the nonvolatile memory 18 through the memory interface 17b. For example, the image is transmitted to the electronic apparatus 20 through the host interface 11 according to an instruction from the electronic apparatus 20, and is displayed on a display unit 26 of the electronic apparatus 20.

Figure 2:
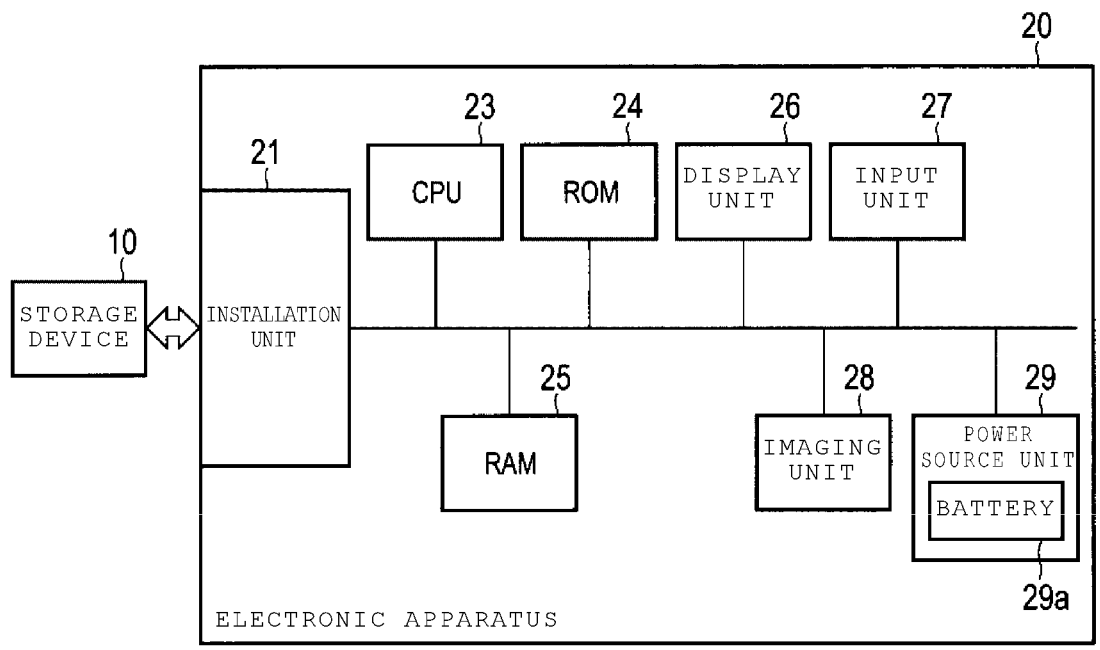
FIG. 2 is a block diagram illustrating an example of a configuration of an electronic apparatus according to the first embodiment.

FIG. 2 is a block diagram illustrating an example of a configuration of the electronic apparatus 20 according to the present embodiment.

The electronic apparatus 20 is an information processing device such as a digital camera, a POS (point-of-sale) terminal, a mobile phone, or a PC. The electronic apparatus 20 is also referred to as a host apparatus in some contexts. The electronic apparatus 20 includes an installation unit 21, a CPU 23, a ROM 24, a RAM 25, a display unit 26, an input unit 27, an imaging unit 28, a power source unit 29, and the like. The installation unit 21, the CPU 23, the ROM 24, the RAM 25, the display unit 26, the input unit 27, the imaging unit 28, the power source unit 29, are connected by a bus. The electronic apparatus 20 may include other elements in addition to those described above.

The installation unit 21 may include the storage device 10 installed therein or thereon. Once the storage device 10 is mounted on or otherwise physically connected to the installation unit 21, the electronic apparatus 20 and the storage device 10 are electrically connected to each other. In addition, the installation unit 21 performs an interface process with the storage device 10 when the storage device 10 is connected.

The CPU 23 is a processor that controls the operations of the electronic apparatus 20. For example, the CPU 23 may be controlled or configured by a control program or the like stored in the ROM 24. The control program may be loaded on the RAM 25 to execute a predetermined process.

For example, the CPU 23 transmits the various commands such as the write command, the read command, and the erase command, and other instructions to the storage device 10 installed in the installation unit 21.

The ROM 24 stores firmware such as the control program used by the CPU 23.

The RAM 25 is used as a work area of the CPU 23, and stores the control program and various pieces of data necessary for executing the control program. The configuration of the RAM 25 is the same as that of the RAM 15.

The display unit 26 displays data in a format that may be recognized by the user of the electronic apparatus 20. For example, the display unit 26 is a video display screen or the like. For example, the electronic apparatus 20 reads the image data, picture data, and the like stored in the nonvolatile memory 18 of the storage device 10 by transmitting the read command to the storage device 10, and displays the read data on the display unit 26 by the instruction of the CPU 23. In addition, the display unit 26 may be capable of displaying still images or moving image data that is captured by the imaging unit 28 and stored in the RAM 25.

The input unit 27 converts an input of the user of the electronic apparatus 20 into input data and sends the input data to the CPU 23. For example, the input unit 27 is a touch panel or the like provided in the display unit 26. In a case where the user presses a display on the display unit 26, the input unit 27 detects the pressed position on the touch panel and outputs touch position information as the input data to the CPU 23.

The input unit 27 may include a plurality of input units. For example, in some instances the input unit 27 maybe a button, a switch, or the like, that a user may operate.

The imaging unit 28 may capture a still image, a moving image (e.g., video data), or both. For example, the imaging unit 28 is a camera. More specifically, the imaging unit 28 is a camera using a solid imaging device, for example, a Charge Coupled Device (CCD) sensor, a Complementary Metal Oxide Semiconductor (CMOS) sensor, or the like.

The imaging unit 28 captures image data by the instruction of the CPU 23, converts the image data into digital data, and stores the digital data in the RAM 25. The image data stored in the RAM 25 is transmitted to the storage device 10 by the instruction of the CPU 23, and can be stored in the nonvolatile memory 18 of the storage device 10.

In general, it is preferable in some embodiments that the image data captured by the imaging unit 28 be managed as a set of image data and thumbnail image data so as to comply with an image format used by certain standard digital camera types, and that this set be stored together in the storage device 10, the RAM 25, or the like. Here, the thumbnail image is an image obtained by reducing an original image, and is generally used for displaying in a list including multiple thumbnail images.

The power source unit 29 may include a switch for turning on/off the power source of the electronic apparatus 20. When the power source is turned on, the electronic apparatus 20 may operate and perform communication by electric power supplied from a battery 29a that is built in the electronic apparatus 20. The battery 29a may be a dry cell battery, a storage battery, a fuel cell, or the like. More specifically, a lithium ion battery may be used as the battery 29a. The battery 29a may be outside the electronic apparatus 20. For example, the battery 29a may be an AC adaptor connected to a power source or the like.

In addition, the electric power supplied from the battery 29a is supplied to the storage device 10 through the installation unit 21. The storage device 10 may operate and perform communication by the electric power supplied from the electronic apparatus 20.

In the present embodiment, the electronic apparatus 20 displays the thumbnail image of the image data read from the nonvolatile memory 18 of the storage device 10 on the display unit 26. The user of the electronic apparatus 20 may select one or more thumbnail images displayed on the display unit 26 through operation of the input unit 27 (e.g., a touch panel). The electronic apparatus 20 may perform a predetermination operation on the image data corresponding to the selected thumbnail image. For example, the predetermined operation may be display, deletion, or the like. The display unit 26 may display the still image or moving image data corresponding to the selected thumbnail image on the display unit 26 in a full screen mode or the like.

Figure 3:
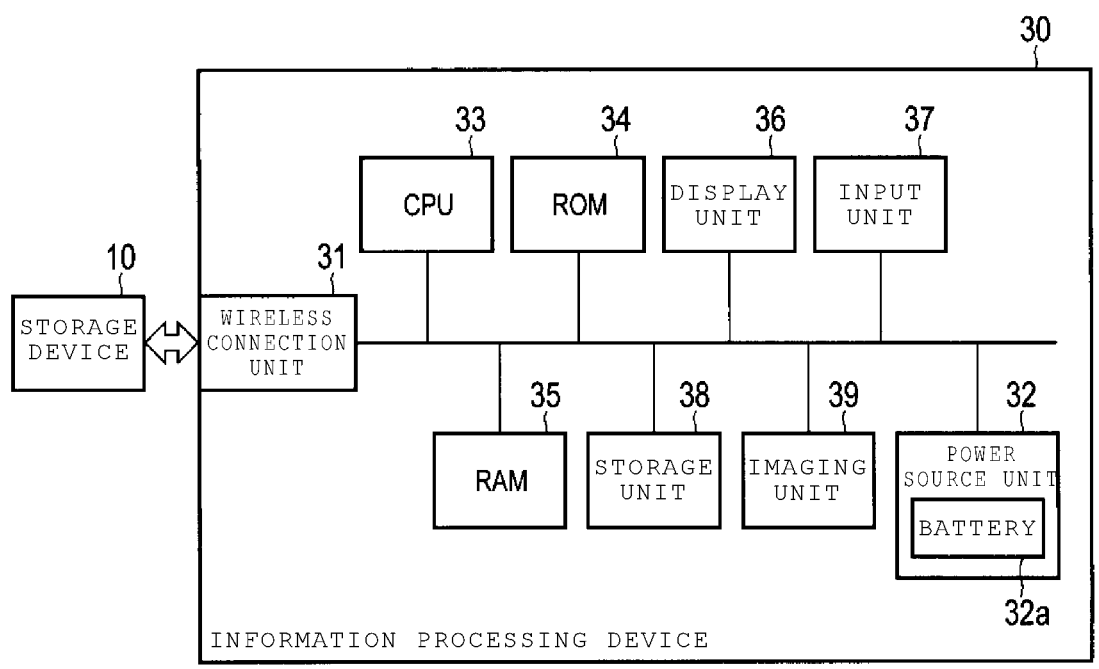
FIG. 3 is a block diagram illustrating an example of a configuration of an information processing device according to the first embodiment.

FIG. 3 is a block diagram illustrating an example of a configuration of the information processing device 30 according to the present embodiment.

For example, the information processing device 30 is a smart phone, a tablet PC, a PC, or the like. The information processing device 30 includes a wireless connection unit 31, a power source unit 32, a CPU 33, a ROM 34, a RAM 35, a display unit 36, an input unit 37, a storage unit 38, an imaging unit 39, and the like. The wireless connection unit 31, the power source unit 32, the CPU 33, the ROM 34, the RAM 35, the display unit 36, the input unit 37, the storage unit 38, the imaging unit 39, and the like are connected by a bus. In addition, the information processing device 30 may include other elements in addition to those described above.

For example, the wireless connection unit 31 performs wireless communication with an external information processing device such as the storage device 10. For example, the wireless connection unit 31 includes a wireless antenna, a signal processing unit for the wireless communication, a communication controller, and the like. For example, the wireless connection unit 31 controls the wireless communication by a wireless LAN protocol such as Wi-Fi. The wireless antenna, the signal processing unit, and the communication controller provided in the wireless connection unit 31 have similar functions as those of the antenna ATa, the wireless communication signal processing unit 19, and the wireless communication interface 17a of the storage device 10 described above.

The wireless connection unit 31 transmits and receives commands, addresses, data, information, instructions, signals, and the like to and from wirelessly connected external devices while being under control of the CPU 33.

The power source unit 32 is a power source that supplies electric power to the information processing device 30. The information processing device 30 may operate and perform communication by the electric power supplied from a battery 39a. The configuration and function of the power source unit 32 are similar to those of the power source unit 29 described above.

The CPU 33 is a processor that controls the operations of the information processing device 30. For example, the CPU 33 may be controlled of configured by a control program or the like stored in the ROM 34. The control program may be loaded on the RAM 35 to execute a predetermined process.

The ROM 34 stores firmware such as the control program used by the CPU 33.

The RAM 35 is used as a work area of the CPU 33, and stores the control program and various pieces of data necessary for executing the control program. The configuration of the RAM 35 is the same as those of the RAM 15 and the RAM 25.

For example, the display unit 36 is a display or the like. The display unit 36 is the similar to the display unit 26 of the electronic apparatus 20 in function.

The input unit 37 is a touch panel or the like provided in the display unit 36, for example. The input unit 37 is similar to the input unit 27 of the electronic apparatus 20.

The storage unit 38 includes a memory controller and a nonvolatile memory, for example. The storage unit 38 outputs stored data to the CPU 33. In addition, the storage unit 38 stores data based on an instruction of the CPU 33. As the nonvolatile memory, various memories can be used similarly to the nonvolatile memory 18 of the storage device 10. The memory controller controls the nonvolatile memory. For example, the storage unit 38 may be a Hard Disk Drive (HDD), a Solid State Drive (SSD), or the like.

The imaging unit 39 may capture a still image, a moving image (video), or both similarly to the imaging unit 28 of the electronic apparatus 20. Functions of the imaging unit 39 are substantially the same as those of the imaging unit 28 of the electronic apparatus 20, and thus a description thereof will be omitted.

In the present embodiment, the information processing device 30 captures the image corresponding to a two-dimensional code displayed on the display unit 26 of the electronic apparatus 20, and then analyzes a character string included in the two-dimensional code. Thereby, information processing device 30 may acquire the identification ID and the password for direct wireless communication with the storage device 10. The information processing device 30 may then wirelessly communicate directly with the storage device 10 by using the acquired identification ID and the password.

The information processing device 30 directly transmits and receives data to and from the storage device 10 by wireless communication. Therefore, the information processing device 30 and the storage device 10 may share the data.

For example, when a storage device lacks a wireless communication function, then if the electronic apparatus 20 does not itself include a wireless communication function, it would be necessary to install the storage device in another information processing device (for example, a PC) having a wireless communication function to permit data to be retrieved or written to the storage device by the information processing device 30 by wireless communication. However, with a storage device 10, image data that is captured by the electronic apparatus 20 and stored in the nonvolatile memory 18 of the storage device 10 can be copied or moved to the information processing device 30 without depending on the functions of the electronic apparatus 20. That is, for example, an image captured by a digital camera (an example of an electronic apparatus 20) lacking wireless connectivity may still be quickly shared to a smart phone (an example of an information processing device 30). Thus, convenience of the user is improved by use of a storage device 10 according to the present disclosure.

In the present embodiment, it is assumed that the host interface 11 is, for example, a SD (secure digital) type interface (e.g., a SD card type format). That is, the electronic apparatus 20 and the storage device 10 may transmit and receive data to each other via the SD interface. In addition, it is assumed that the wireless communication interface 17a is a wireless LAN interface. That is, the electronic apparatus 20 and the information processing device 30 may transmit and receive data to each other via the wireless LAN interface. In addition, it may be assumed that the storage device 10, the electronic apparatus 20, and the information processing device 30 may transmit and receive data amongst each other via various other interfaces non-exclusively.

Figure 4:
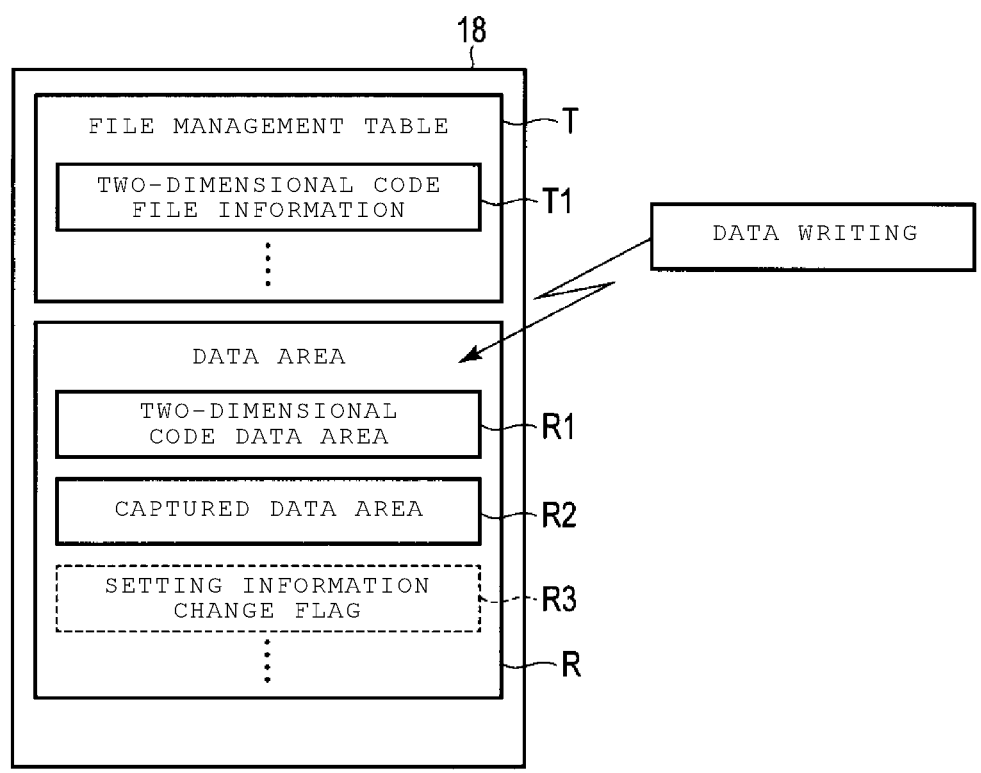
FIG. 4 is a diagram illustrating an example of a data management in a nonvolatile memory according to the first embodiment.

FIG. 4 is a diagram illustrating an example of a data management in the nonvolatile memory 18 of the storage device 10 according to the present embodiment. The nonvolatile memory 18 includes a file management table T and a data area R.

The data area R is an area that stores data that has been written in the nonvolatile memory 18. More specifically, when writing data to the nonvolatile memory 18, the CPU 13 of the storage device 10 transmits data to be written to the memory interface 17b through the bus. The memory interface 17b stores the received data in the data area R, for example, in a file unit.

The data area R can include a two-dimensional code data area R1, a captured data area R2, and other areas.

The two-dimensional code data area R1 is an area where a two-dimensional code image is stored.

The captured data area R2 is an area where the image data captured by the imaging unit 28 is stored as files.

The file management table T stores management information for the data contained in the data area R. For example, the file management table T stores a storage position (for example, a start address, an end address, and the like), a storage size (file size), and the like for each file stored in the data area R.

For example, the file management table T is a File Allocation Table (FAT) or the like. The file management table T is generated by the CPU 13 of the storage device 10.

In the present embodiment, it may be preferable that two-dimensional code file information T1 corresponding to the two-dimensional code data area R1 is generated before the storage device 10 is started to be used by the user, such as at the time of factory shipment of the storage device 10 and the two-dimensional code file information T1 is not rewritten during use.

In addition, in the two-dimensional code file information T1, the size of the two-dimensional code data area R1 is stored. It is preferable that the size of the two-dimensional code data area R1 be larger than the file size of the generated two-dimensional code image data, that is, the size of the two-dimensional code data area R1 is a greater than the minimum file storage size by some amount. For example, the size of the two-dimensional code data area R1 may be the maximum file size of any image generated corresponding to the maximum character string of the SSID and the password, or may be the maximum file size of the image that may be captured by the imaging unit 28 of the electronic apparatus 20. In a case where the actual file size of the generated two-dimensional code image data is smaller than the size of the two-dimensional code data area R1, a dummy data can be added to the two-dimensional code image, and thus the file size of the two-dimensional code image data can be made equal to the full size of the two-dimensional code data area R1.

That is, the two-dimensional code file information T1 stored in the file management table T is not influenced by writing, reading, and deleting of the two-dimensional code image data and does not change. Even when the two-dimensional code image data is rewritten, the stored file size of the two-dimensional code image data in the two-dimensional code data area R1 remains constant.

The data area R further includes a setting information change flag R3. The setting information change flag R3 is, for example, flag information indicating whether or not the storage device 10 changes the SSID and password every time the storage device 10 is restarted. More specifically, for example, in a case where setting information change flag R3 is in an on state (for example, "1"), the storage device 10 changes the SSID and the password of the wireless LAN at the time of the start, and in a case where setting information change flag R3 is in an off state (for example, "0"), the storage device 10 does not change the SSID and the password of the wireless LAN at the time of the start. The setting information change flag R3 may be set or changed, for example, by the electronic apparatus 20 operating through the host interface 11, or may be set or changed from the information processing device 30 operating through the wireless communication interface 17a.

Figure 5:
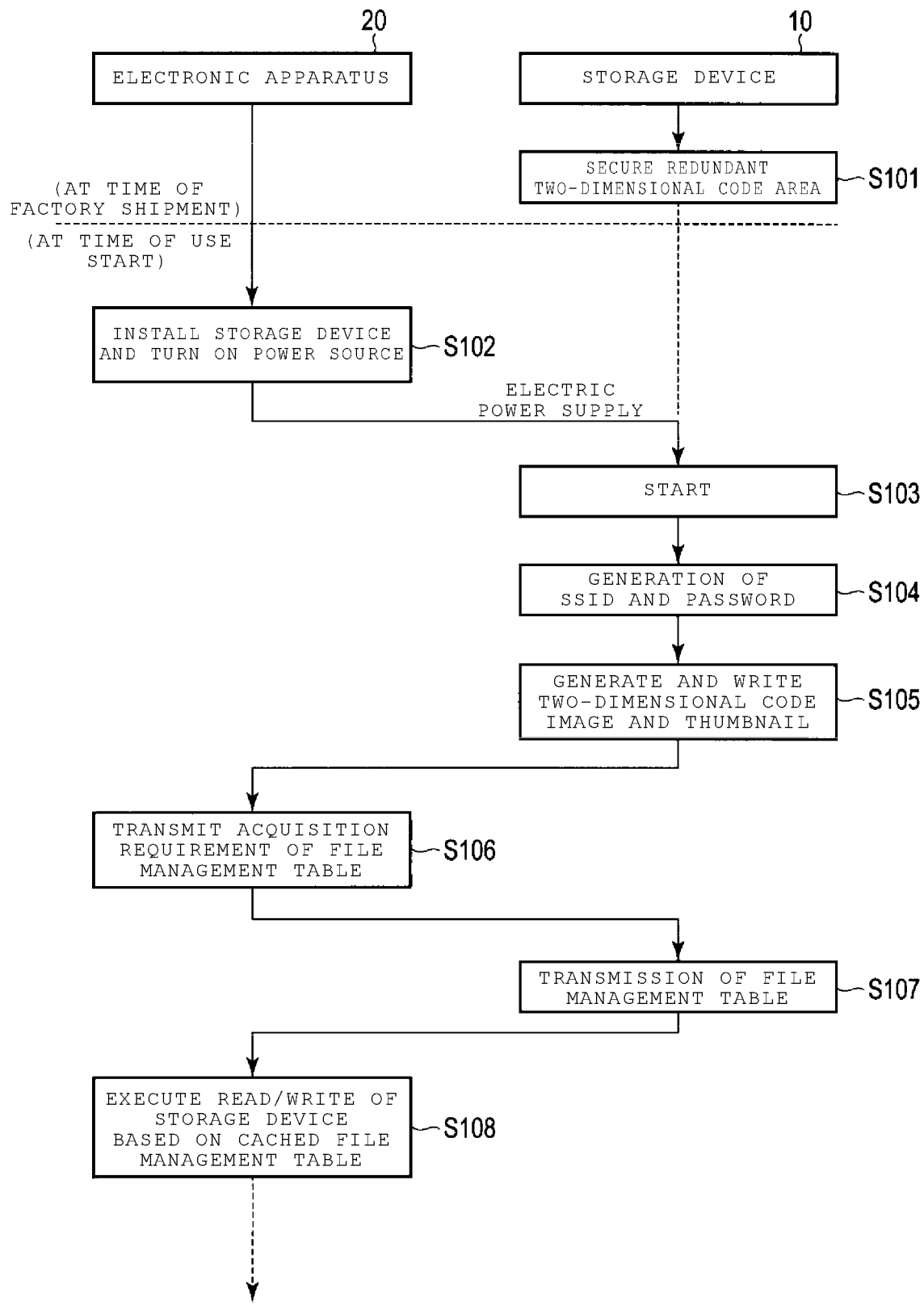
FIG. 5 is a flowchart illustrating an example of a two-dimensional code generation process according to the first embodiment.

FIG. 5 is a flowchart illustrating an example of a two-dimensional code generation process according to the present embodiment.

In step S101, a two-dimensional code data area of an appropriate maximum size is secured in the nonvolatile memory 18. More specifically, the two-dimensional code file information T1 corresponding to the two-dimensional code data area R1 is generated in the file management table T of the nonvolatile memory 18, and thus the two-dimensional code data area R1 is secured/reserved in the data area R of the nonvolatile memory 18.

In addition, for example, the process of step S101 is executed by the CPU 13 of the storage device 10 based on a command from an external device in a state in which the storage device 10 is installed in the external device. In addition, it is preferable that the process of step S101 is completed before the storage device 10 is used by an end user (for example, at or before the time of shipment from the factory to a consumer/end user).

In step S102, the storage device 10 is installed in the electronic apparatus 20. Then, the electric power of the electronic apparatus 20 is turned on, and thus the electric power is supplied to the storage device 10.

In step S103, the storage device 10 starts by receiving the electric power, and is in an operable state. More specifically, the CPU 13 of the storage device 10 loads the control program stored in the ROM 14 into the RAM 15, and sets the control program to be a state in which the control program is executable.

In step S104, the CPU 13 generates the SSID and the password for a wireless LAN using the storage device 10 as the access point.

In addition, the CPU 13 may check whether the setting information change flag R3 is set, and may automatically generate a SSID and password if the setting information change flag R3 is in the on state.

In step S105, the CPU 13 generates the two-dimensional code image corresponding to the SSID and the password generated in step S104 along with a thumbnail image of the two-dimensional code image. In a case where the file sizes of the image data and the thumbnail image data are smaller than the file storage size of the two-dimensional code image data region reserved by the two-dimensional code file information T1, the CPU 13 generates two-dimensional code image data included added dummy data to so that the file storage size is equal to reserved file size. In addition, the CPU 13 stores the two-dimensional code image data and the thumbnail image data in the two-dimensional code data area R1 designated by the two-dimensional code file information T1.

In step S106, the CPU 23 of the electronic apparatus 20 transmits an acquisition request to the storage device 10. For example, the acquisition request is the read command or the like requesting information of the file management table T.

In step S107, in a case where the CPU 13 of the storage device 10 receives the acquisition request from the electronic apparatus 20, the CPU 13 of the storage device 10 reads the file management table T from the nonvolatile memory 18, temporarily caches (stores) the file management table T in, for example, the buffer 16 or the RAM 15, and transmits the cached file management table T to the electronic apparatus 20.

In step S108, the CPU 23 of the electronic apparatus 20 temporarily caches the file management table T received from the storage device 10 in the RAM 25. The CPU 23 transmits the read command and the write command to the storage device 10 based on information in the cached file management table T, and reads and writes arbitrary data (e.g., user data, image data, etc.) to and from the storage device 10. For example, the CPU 23 generates the image data for the images captured by the imaging unit 28 and the thumbnail image data of the image data, and stores the image data and the thumbnail image data in the nonvolatile memory 18 of the storage device 10. In addition, the CPU 23 reads the stored thumbnail image data from the storage device 10 and displays the thumbnail image data on the display unit 26. In addition, for example, the CPU 23 reads the full image data from the storage device 10 corresponding to any thumbnail image selected by the operation of the user and then displays the full image data on the display unit 26.

In general, the file management table T of the storage device 10 is cached in the electronic apparatus 20 that is a host apparatus, and the electronic apparatus 20 reads and writes data based on the information of the cached file management table. Therefore, in general, any apparatus other than the connected electronic apparatus 20 (the host device for storage device 10) does not rewrite the file management table T of the storage device 10. For example, if the CPU 13 of the storage device 10 rewrites the file management table T in the storage device 10, an inconsistency (conflict) occurs with the file management table T that was cached in the electronic apparatus 20. If the file management table T and the cached file management table T are inconsistent, the electronic apparatus 20 must recognize that the file management table T is broken (in error), or else the correct data may not be read.

In the present embodiment, the file information of the two-dimensional code image file to be rewritten by the CPU 13 of the storage device 10 is reserved in the file management table T. However, it is impossible to alter the file information for the two-dimensional code image file previously reserved, and thus an inconsistency of in file management table T will not occur at least respect to two-dimensional code image file.

In the example of FIG. 5, the process of generating the SSID and the password executed by the CPU 13 of the storage device 10 (refer to step S104) was described as performed before the file management table T is read by the electronic apparatus 20. However, this process may be performed at any time. For example, the SSID and the password may be generated immediately after the two-dimensional code data area R1 is secured in step S101, or may be generated after step S108. In addition, the CPU 13 may update the SSID and the password after an external apparatus, such as the information processing device 30, connects to the wireless LAN using the generated SSID and password. In addition, the external apparatus, such as the information processing device 30, may change the SSID and the password stored in the storage device 10 by operations through the wireless connection unit 31 after the external apparatus is connected to the wireless LAN.

In any case, according to the generation or the update of the SSID and the password, new two-dimensional code image data and thumbnail image data are generated and stored in the nonvolatile memory 18. However, since files sizes of the generated two-dimensional image data and thumbnail image data do not exceed the two-dimensional code file information T1, it is not necessary to update the two-dimensional code file information T1.

That is, in the present embodiment, even in a case where the storage device 10 automatically generates the image data and stores the image data in the nonvolatile memory 18 without the instruction from the electronic apparatus 20, there is no inconsistency between the file management table T cached by the electronic apparatus 20 and the file management table T stored in the nonvolatile memory 18 of the storage device 10 due to the generation and storage of new coded information.

In addition, any one of the SSID and the password may be updated or both of the SSID and the password may be updated.

Hereinafter, with reference to FIGS. 6 and 7, a reading process of the two-dimensional code and a wireless connection process by the information processing device 30 will be described.

Figure 6:
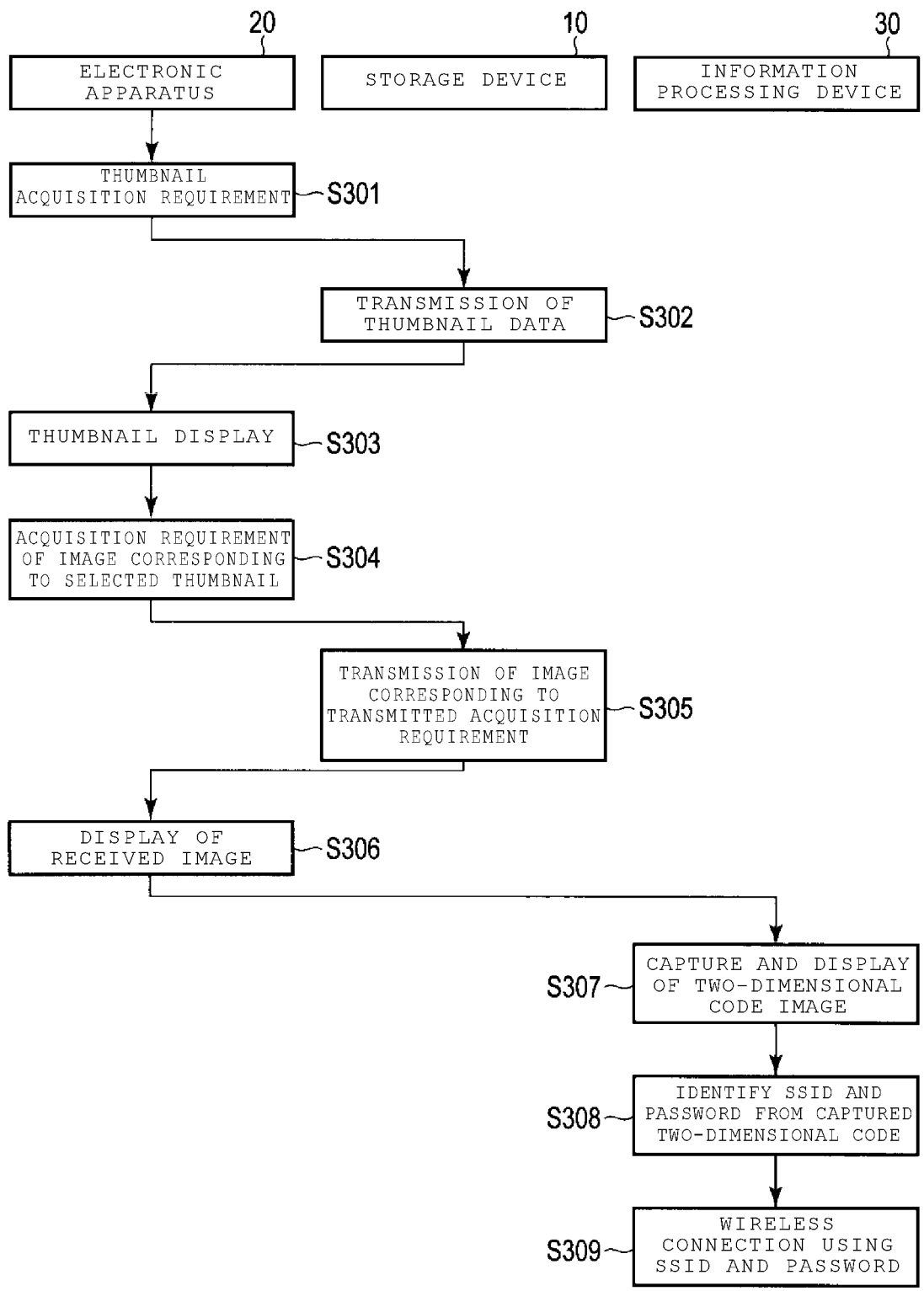
FIG. 6 is a flowchart illustrating a first example of a read process of a two-dimensional code according to the first embodiment.

FIG. 6 is a flowchart illustrating a first example of the reading process of the two-dimensional code according to the present embodiment.

Figure 7:
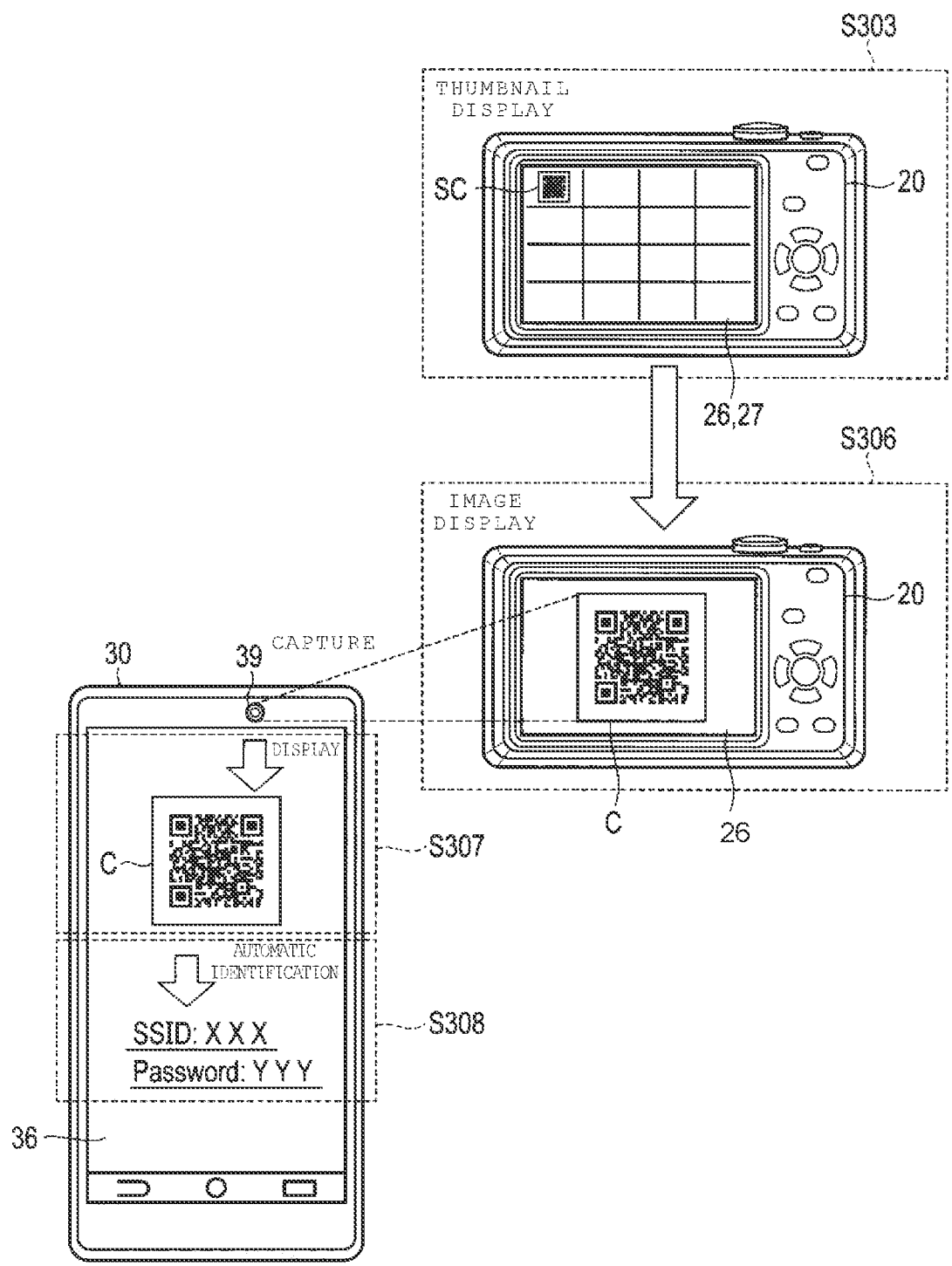
FIG. 7 is a conceptual diagram illustrating a read procedure of the two-dimensional code according to the first embodiment.

FIG. 7 is a conceptual diagram illustrating a read procedure of the two-dimensional code according to the present embodiment. More specifically, FIG. 7 illustrates states of the display unit 26 of the electronic apparatus 20 and the display unit 36 of the information processing device 30 in each process step of FIG. 6.

In step S301, the CPU 23 of the electronic apparatus 20 transmits an acquisition request for the thumbnail image data stored in the nonvolatile memory 18. For example, the acquisition request is a read command. In addition, the acquisition request may be divided and transmitted for each number of sheets that may be listed on the display unit 26. For example, as shown in FIG. 7 (step S303), in a case where sixteen thumbnail images of may be displayed at once on the display unit 26, the CPU 23 transmits the acquisition request for data corresponding to a total of sixteen thumbnail images. Next, for example, in a case where the user requests a display of the next 16 thumbnail images by an operation of the input unit 27, the CPU 23 transmits the acquisition request for data corresponding to the next sixteen thumbnail images to the storage device 10.

In step S302, the CPU 13 of the storage device 10 reads the thumbnail image data from the nonvolatile memory 18 corresponding to the acquisition request received from the electronic apparatus 20, and transmits the thumbnail image data to the electronic apparatus 20. In the thumbnail image data transmitted to the electronic apparatus 20, both of the data of the thumbnail image SC of the two-dimensional code generated by the storage device 10 and stored in the non-volatile memory 18 in step S105 and the thumbnail image data stored in the nonvolatile memory 18 by receiving the command from the electronic apparatus 20 by step S108. In other words, in addition to the data stored in the nonvolatile memory 18, the CPU 13 of the storage device 10 also transmits the data generated inside the storage device 10 to the electronic apparatus 20 according to the write command received from the electronic apparatus 20 through the host interface 11, in response to the acquisition requirement of the thumbnail image data received from the electronic apparatus 20.

In step S303, the CPU 23 of the electronic apparatus 20 receives the thumbnail image data from the storage device 10, and displays the thumbnail image data in a list on the display unit 26. The list display includes the thumbnail image SC generated by the storage device 10.

In step S304, for example, in a case where a thumbnail image is selected by the user, the CPU 23 of the electronic apparatus 20 transmits the acquisition request of the full image data corresponding to the selected thumbnail to the storage device 10.

In step S305, the CPU 13 of the storage device 10 reads the image data corresponding to the acquisition request from the nonvolatile memory 18 and transmits the image data to the electronic apparatus 20.

In step S306, the CPU 23 of the electronic apparatus 20 receives the image from the storage device 10 and displays the image on the display unit 26. In the conceptual diagram shown in FIG. 7, the thumbnail image SC (corresponding to the two-dimensional code) is selected by the user, and the two-dimensional image C corresponding to the thumbnail image SC is then displayed on the electronic apparatus 20.

In step S307, when the two-dimensional code image C is displayed on the display unit 26 of the electronic apparatus 20 based on the operation of the user or the like as shown in FIG. 7, the imaging unit 39 of the information processing device 30 can then capture and image of the two-dimensional code image C. The captured two-dimensional code image C is displayed on the display unit 36.

In step S308, the CPU 33 of the information processing device 30 identifies the SSID and the password of the wireless LAN for wirelessly accessing the storage device 10 directly from the captured two-dimensional code image C. In addition, for the identification process, a dedicated application (an "app") executed by the CPU 33 of the information processing device 30 may be used.

In step S309, the wireless connection unit 31 of the information processing device 30 is wirelessly connected to the storage device 10 using the SSID and the password identified in step S308. In addition, for example, the wireless connection process may be performed at any time based on the operation of the user. Alternatively, the wireless connection process may be performed when the identification process of the SSID and the password is completed in step S308.

Figure 8:
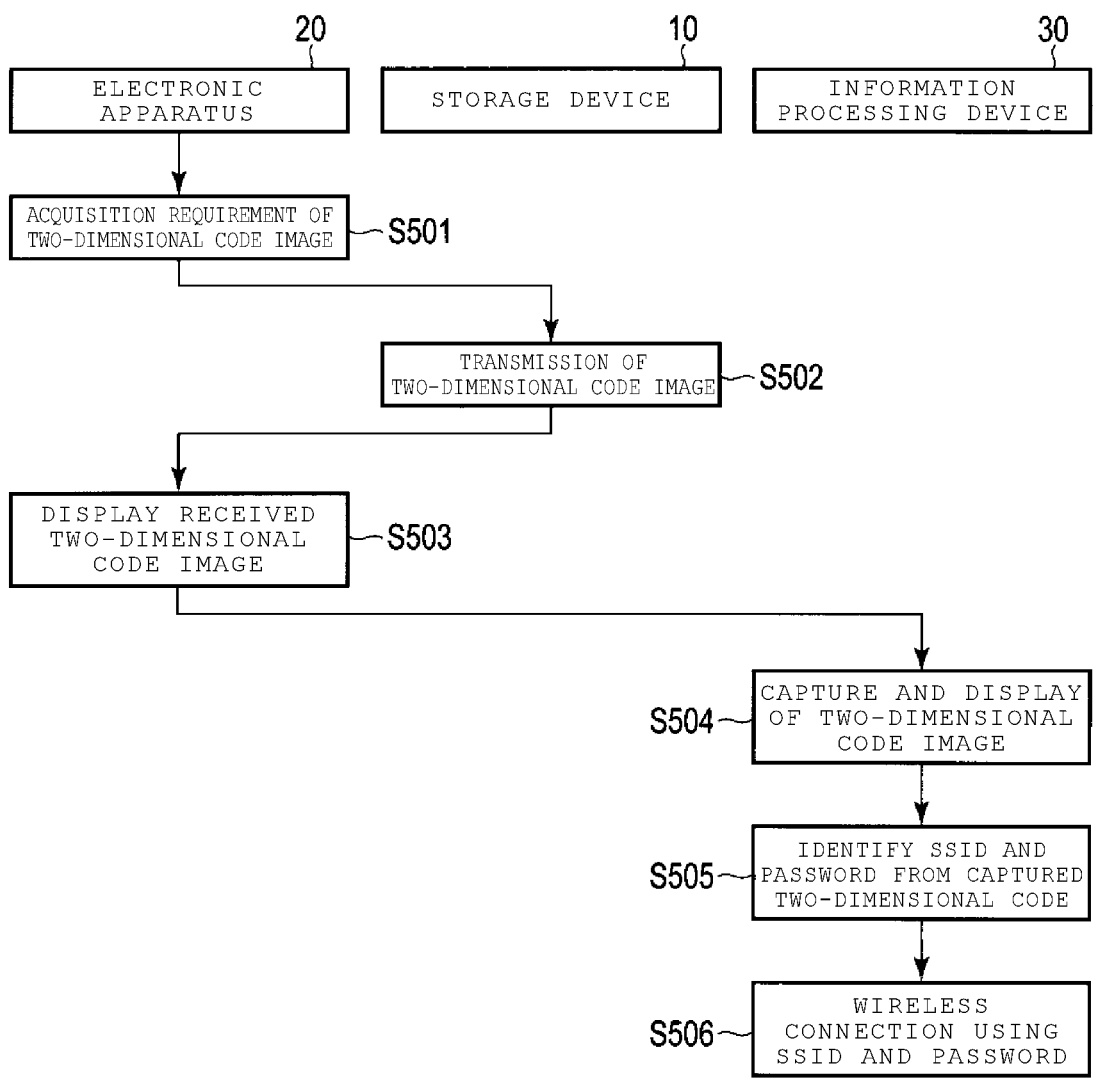
FIG. 8 is a flowchart illustrating a second example of the read process of the two-dimensional code according to the first embodiment.

FIG. 8 is a flowchart illustrating a second example of the reading process of the two-dimensional code according to the present embodiment.

In the conceptual diagram of FIG. 7 described above, the electronic apparatus 20 is an apparatus capable of capturing an image using, for example, the imaging unit 28 and displaying a thumbnail image of the captured image to the user of the electronic apparatus 20. That is, in FIG. 7, the electronic apparatus 20 could be a digital camera or the like.

On the other hand, in the example of FIG. 8, the electronic apparatus 20 may be an apparatus that is not specifically operable by the user in relevant manner, that is, electronic apparatus 20 may be an apparatus that does not include an input unit 27 or the like. Alternatively, the electronic apparatus 20 may be an apparatus that is not for imaging purposes or lacks an imaging function, that is, electronic apparatus 20 can be an apparatus that does not include an imaging unit 28. Examples of electronic apparatus 20 include a surveillance camera, a POS terminal, and the like. However, when the electronic apparatus 20 includes a display unit 26, it is still possible to display a two-dimensional code image including the SSID and the password for the wireless LAN by which the storage device 10 can be wirelessly accessed on the display unit 26. The external information processing device 30 thus may capture the displayed two-dimensional code image and be connected to the wireless LAN of storage device 10. Therefore, the information processing device 30 may easily obtain the data from the nonvolatile memory 18 of the storage device 10 installed in an electronic apparatus 20 or likewise store data in the nonvolatile memory 18.

In step S501, the CPU 23 of the electronic apparatus 20 transmits the acquisition request for the two-dimensional code image data stored in the nonvolatile memory 18 to the storage device 10. In addition, the timing at which the acquisition request is transmitted may be designated by the user of the electronic apparatus 20 or may be set by a control program executed by the CPU 23 of the electronic apparatus 20.

In step S502, the CPU 13 of the storage device 10 reads the two-dimensional code image data corresponding to the acquisition request from the nonvolatile memory 18 and transmits the two-dimensional code image data to the electronic apparatus 20.

In step S503, the CPU 23 of the electronic apparatus 20 receives the two-dimensional code image data from the storage device 10 and displays the two-dimensional code image on the display unit 26.

Since processes in steps S504 to S506 are similar to the processes in steps S307 to S309 of FIG. 6, further descriptions will be omitted.

According to the embodiment described above, the storage device 10 automatically generates the SSID and the password and also generates the two-dimensional code including the generated SSID and password. The electronic apparatus 20 displays the two-dimensional code image received from the storage device 10. The information processing device 30 reads the two-dimensional code displayed on the display unit 26 of the electronic apparatus 20 using the imaging unit 39 and identifies the SSID and the password included in the two-dimensional code so as to be connected to the wireless LAN for direct communication to the storage device. Therefore, for example, it is possible to easily set and change the SSID and the password of the storage device 10 even though the storage device 10 does not include a user interface permitting the user to perform a text (character) input or the like. Thus, convenience of the user is improved. In addition, the SSID and the password set by the storage device 10 may be easily supplied to other apparatuses.

In addition, in some examples, the SSID and the password generated by the storage device 10, or otherwise stored in storage device 10, may be transmitted to the electronic apparatus 20 in a format other than the two-dimensional code image. For example, the SSID and the password may be transmitted to the electronic apparatus 20 in a format of a one-dimensional code such as a bar code, or a text string, and displayed on the display unit 26. In this case, the imaging unit 39 reads the one-dimensional code displayed on the display unit 26, or the user observes the SSID and the password displayed on the display unit 26 in a human readable format and then manually inputs the observed SSID and password. Therefore, the CPU 33 of the information processing device 30 may identify the SSID and the password. The wireless connection unit 31 of the information processing device 30 may connect to the wireless LAN using the identified SSID and the password.

In the present embodiment, the CPU 13 of the storage device 10 may generate the SSID and the password every time the power is supplied from the electronic apparatus 20 and the storage device 10 is started. Therefore, since the SSID and the password are changed every time the user restarts the electronic apparatus 20, it is possible to reduce a possibility that an unintended third party will be able to connect to the wireless LAN of the storage device 10. That is, security of the wireless LAN is increased and reliability of the wireless LAN is improved.

In the present embodiment, in the file management table T of the storage device 10, the two-dimensional code file information T1 for securing the two-dimensional code data area R1 is generated in advance with a size that is larger than the maximum file size of an image that maybe captured by the imaging unit 28 of the electronic apparatus 20. That is, even when the storage device 10 performs rewriting on the two-dimensional code data area R1 at some time without depending on an instruction of the electronic apparatus 20, the two-dimensional code file information T1 in the file management table T need not be affected. Therefore, it is possible to prevent any inconsistency between the file management table T cached by the electronic apparatus 20 and the file management table T of the storage device 10 related to changes in the two-dimension code data.

In the present embodiment, the storage device 10 selects whether or not to update the SSID and the password by changing a state of the setting information change flag R3. In addition, a state of the setting information change flag R3 may be changed through the electronic apparatus 20 and/or the information processing device 30. Therefore, for example, in a case where the electronic apparatus 20 and the information processing device 30 are used in a state in which the electronic apparatus 20 and the information processing device 30 are separated from each other, a flexible operation such as an operation of not updating the SSID and the password is possible by turning off the setting information change flag R3.

In the present embodiment, the SSID of the wireless LAN for accessing the storage device 10 may be concealed. That is, the SSID may be a stealth ID. Therefore, other apparatuses may not see the SSID in a search for SSIDs. Thus, opportunities for unnecessary communication between the storage device 10 other devices is further reduced. Accordingly, it is possible to further improve security of the wireless LAN.

In addition, in the present embodiment, the image stored in the nonvolatile memory 18 may be encoded (encrypted). More specifically, in step S105 of FIG. 5, the CPU 13 of the storage device 10 may generate and encode the two-dimensional code image data and the thumbnail image data, and store the encoded two-dimensional code image data and the thumbnail image data in the nonvolatile memory 18. Therefore, even when the storage device 10 is physically removed from the electronic apparatus 20 and handed over to a third party, the two-dimensional code image data and the thumbnail image data may not be read from any other apparatus lacking decoding means. Thus, it is possible to improve security. In a case where the two-dimensional code data image and the thumbnail image data are encoded, the electronic apparatus 20 may decode the encoded two-dimensional code image data and the thumbnail image data using key (e.g., encryption/decryption key) information or the like supplied from the storage device 10 in advance. It is possible to securely perform a publication of the image and the data of the storage device 10 that does not have a user interface for the text input, by providing such a structure of the encoding.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A storage device that is installable in an electronic apparatus, the storage device comprising:
   a first communication interface for connecting the electronic apparatus to the storage device;
   a nonvolatile memory for storing data and data management table storing a data size and address information for data stored in the nonvolatile memory; and
   a processor configured to change at least one piece of data stored in the nonvolatile memory without changing file management information stored in the data management table for the at least one piece of data, the processor being configured to change the at least one piece of data without receiving an instruction from the electronic apparatus through the first communication interface, wherein
   the file management information includes data size information for the at least one piece of data, and
   the processor is configured to change the at least one piece of data each time power is supplied to the storage device from the electronic apparatus upon startup.

2. The storage device according to claim 1, further comprising:
   a wireless antenna; and
   a second communication interface for providing wireless communication to an external device via the wireless antenna, wherein
   the at least one piece of data includes an identification ID and a password permitting wireless communication by the external device via the second communication interface.

3. The storage device according to claim 2, wherein
   the processor is configured to generate image data corresponding to the identification ID and the password, and
   the at least one piece of data including the identification ID and the password is the generated image data.

4. The storage device according to claim 3, wherein the wireless communication via the second communication interface is according to a wireless local area network protocol and the identification ID is an SSID.

5. The storage device according to claim 1, wherein the first communication interface is a secure digital (SD) type interface.

6. The storage device according to claim 1, wherein the processor is configured to encode the at least one piece of data.

7. The storage device according to claim 1, further comprising:
   a second interface for providing wireless communication to an external device, wherein
   the at least one piece of data includes an identification ID and a password permitting wireless communication by the external device via the second interface.

8. The storage device according to claim 7, wherein the processor is configured to add dummy data to the at least one piece of data such that a file size of the at least one piece of data remains unchanged.

9. The storage device according to claim 1, further comprising:
   a second communication interface for providing wireless communication to an external device that is not the electronic apparatus, wherein
   the first communication interface connects the electronic apparatus to the storage device when the storage device is physically installed in the electronic apparatus, the processor is configured to convert the at least one piece of data to an encoded image and send the encoded image to the electronic apparatus via the first communication interface, and the at least one piece of data includes an identification ID and a password for permitting wireless communication to the external device via the second communication interface.

10. The storage device according to claim 1, further comprising:
a wireless antenna; and
a second communication interface for providing wireless communication to an external device via the wireless antenna, wherein
the processor is configured to generate first image data corresponding to an identification ID and a password for permitting wireless communication by the external device via the second communication interface when the processor is started,
the processor is configured to generate second image data by adding dummy data to the generated first image as the at least one piece of data when a file size of the generated first image data is less than a size indicted by the data size information, and
a file size of the generated second image data is equal to the size indicated by the data size information.

11. An electronic system, comprising:
an electronic apparatus;
a storage device installed in the electronic apparatus, the storage device comprising:
a first communication interface connecting the storage device to the electronic apparatus;
a nonvolatile memory for storing data and data management table storing a data size and address information for data stored in the nonvolatile memory; and
a processor configured to change at least one piece of data stored in the nonvolatile memory without changing file management information stored in the data management table for the at least one piece of data, the processor being configured to change the at least one piece of data at startup of the storage device upon receiving power from the electronic apparatus, the processor changing the at least one piece of data without receiving an instruction from the electronic apparatus through the first communication interface, wherein
the file management information includes data size information for the at least one piece of data,
the electronic apparatus is configured to read the data management table from the storage device via the first communication interface,
the electronic apparatus is configured to send a write command to the storage device based on the data management table read from the storage device, and
the processor is configured to write data specified by the write command into the nonvolatile memory.

12. The electronic system according to claim 11, wherein the electronic apparatus includes a display device, and
the electronic apparatus is configured to display image data supplied from the storage device through the first communication interface.

13. The electronic system according to claim 12, wherein the storage device further comprises:
a second communication interface for providing wireless communication to an external device via a wireless antenna, the first communication interface connects the electronic apparatus to the storage device when the storage device is physically installed in the electronic apparatus, the at least one piece of data includes an identification ID and a password for permitting wireless communication to the external device via the second communication interface, the processor is configured to convert the at least one piece of data to an encoded image and send the encoded image to the electronic apparatus via the first communication interface, and the electronic apparatus is configured to display the encoded image on the display.

14. The electronic system according to claim 13, wherein the wireless communication via the second communication interface is according to a wireless local area network protocol and the identification ID is an SSID.

15. The electronic system according to claim 14, wherein the first communication interface is a secure digital (SD) type interface, and
the processor is configured to change the at least one piece of data each time the processor is started.

16. The electronic system according to claim 15, wherein the external device is configured to capture an image of the displayed encoded image, acquire the identification ID and the password from the captured image, and wirelessly communicate with the storage device by using the acquired identification ID and password.

17. The electronic system according to claim 11, wherein the processor is configured to change the at least one piece of data each time the storage device is started.

18. The electronic system according to claim 11, wherein the processor is further configured to:
generate a two-dimensional code image corresponding to an SSID and a password for permitting wireless communication between the storage device and an external device,
generate a thumbnail image of the two-dimensional code image,
add dummy data to a combination of the two-dimensional code image and the thumbnail image if a file size of the combination is less than a file size indicated by the data size information for the at least one piece of data so that the file size of the combination with the added dummy data is equal to the file size indicated by the data size information, and
change the at least one piece of data stored in the nonvolatile memory to the combination with the added dummy data without changing file management information stored in the data management table for the at least one piece of data.

19. The electronic system according to claim 11, wherein the storage device further comprises:
a wireless antenna; and
a second communication interface for providing wireless communication to an external device via the wireless antenna, wherein
the processor is configured to generate first image data corresponding to an identification ID and a password for permitting wireless communication by the external device via the second communication interface when the processor is started,
the processor is configured to generate second image data by adding dummy data to the generated first image as the at least one piece of data when a file size of the generated first image data is less than a size indicted by the data size information, and a file size of the generated second image data is equal to the size indicated by the data size information.

\* \* \* \* \*